United States Patent [19]

Stone

[11] 4,119,110

[45] Oct. 10, 1978

[54] FLUID PURGING SYSTEM

[75] Inventor: Kirby Lee Stone, Cincinnati, Ohio

[73] Assignee: Cincinnati Milacron Inc., Cincinnati, Ohio

[21] Appl. No.: 811,086

[22] Filed: Jun. 29, 1977

[51] Int. Cl.[2] .................................... B29F 1/00

[52] U.S. Cl. .................................... 137/15; 137/240; 137/563; 222/148

[58] Field of Search .................................... 137/15, 240, 563; 222/148

[56] References Cited

U.S. PATENT DOCUMENTS

| | | | |
|---|---|---|---|
| 2,957,484 | 10/1960 | Nordin | 137/154 X |
| 3,181,544 | 5/1965 | Reid | 137/15 |
| 3,637,136 | 1/1972 | Bok | 137/240 X |
| 3,908,862 | 9/1975 | Chandra | 222/134 X |

*Primary Examiner*—Alan Cohan

*Attorney, Agent, or Firm*—James D. Liles

[57] ABSTRACT

A method of purging a particulate suspension fluid from a fluid system during system shut-down utilizes an unparticulated constituent as the purging fluid. The unparticulated constituent remains in the system during shut-down periods and is subsequently converted to a composite fluid of the type it was previously used to purge.

2 Claims, 1 Drawing Figure

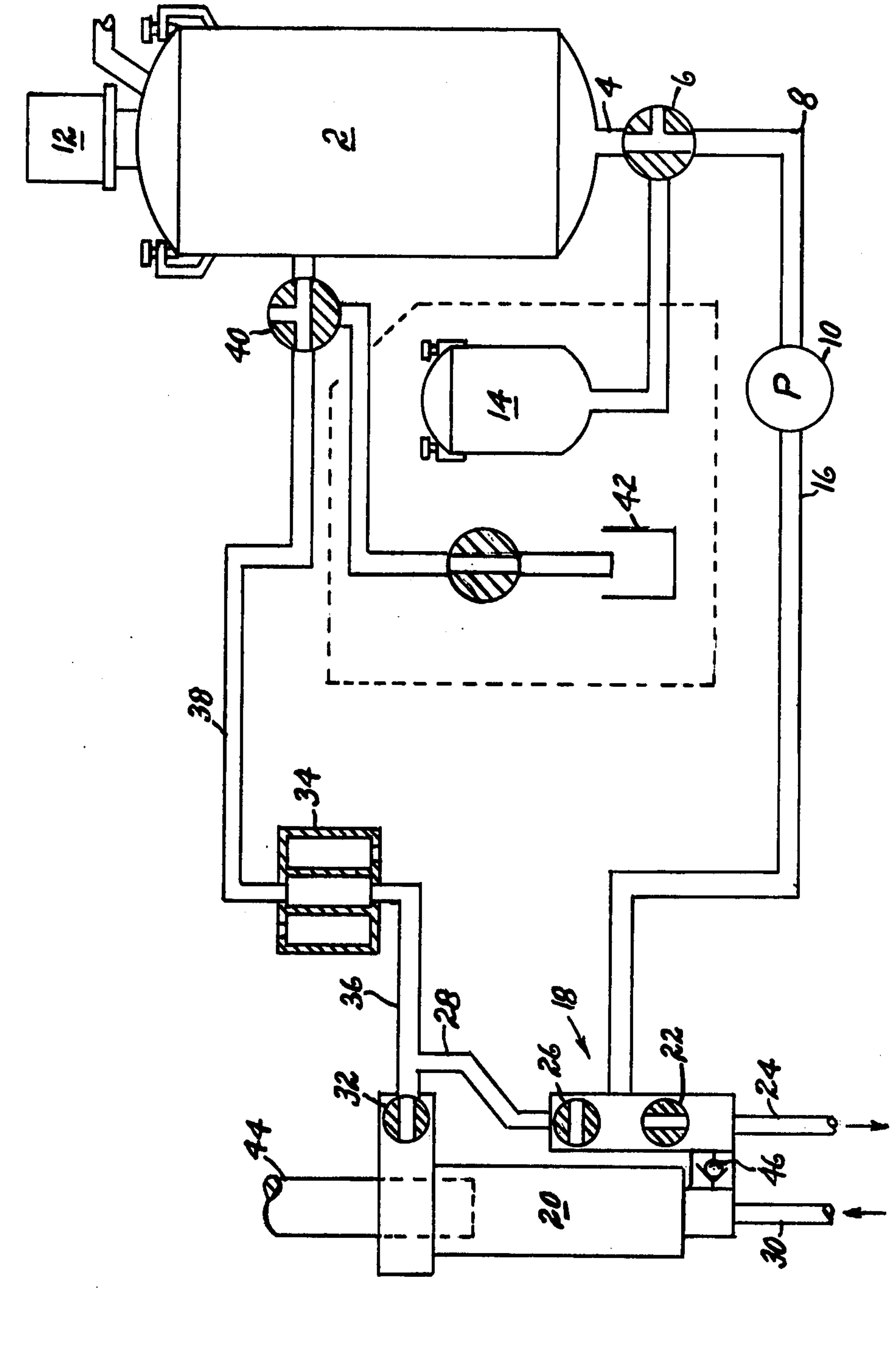
2
4
6
8
10
P
12
14
16
18
20
22
24
26
28
30
32
34
36
38
40
42
44
46

FLUID PURGING SYSTEM

BACKGROUND

In fluid systems, it is frequently necessary to utilize composite fluids which cannot be stored in the system during periods of flow stagnation. For example, liquid reaction molding systems may use glass fiber suspensions in the one of the reagents which is to be mixed. A glass fiber generally remains suspended so long as the system remains operative and the particulated fluid remains dynamic. When, however, the fluid is stagnated, as for example during system shut-down, the particulated matter tends to migrate downwardly under gravity bias and settle in the bottom portions of the fluid system. As the particulate matter accumulates, it tends to pack, and the possibility exists that redispersion will not occur when the system is started once again. The failure of the particulate matter to redisperse results in system flow obstructions.

One method of preventing particulate accumulation is to purge the fluid system of the composite fluid during system breakdown. The prior art systems have purged fluids in a variety of ways. One method of removing fluid has been to force high-pressure air through the system. Another method has been solvent purging in which a solvent is used to flush and cleanse the system of the reactive material. These methods have not been entirely satisfactory for all systems, however. For example, in the air purge method, the air has a disadvantageous tendency to channel through the liquid and leave a thick peripheral film of liquid in the lines. The solvent purge method overcomes the disadvantage of channeling but tends to contaminate the reactant it is removing. This latter disadvantage while perhaps tolerable when small amounts of fluid are to be removed, becomes significant with larger systems due to the large amount of reactants that become unusable due to contamination. The present invention alleviates the above-mentioned problems and ameliorates many of the problems encountered in the purging process. The purging fluid is recaptured and upgraded for future use in the system.

SUMMARY OF THE INVENTION

The invention relates to purging of fluid systems and is disclosed in connection with a liquid reaction molding system utilizing a particulate suspension fluid. A composite fluid is displaced from a fluid system by a constituent fluid, the constituent fluid occupying the system during shut-down. The constituent fluid is then displaced by the composite fluid after system shut-down. It is then collected and converted into the composite fluid and thereafter utilized in the fluid system.

DESCRIPTION OF THE DRAWING

The sole drawing FIGURE schematically depicts one-half of a liquid reaction molding system which might utilize the purging method of the present invention.

DESCRIPTION OF THE PREFERRED EMBODIMENTS

Referring to the sole drawing FIGURE, one-half of a ratio-controlled mixing apparatus is shown. The depicted apparatus is used for liquid injection molding and is of the type disclosed in USLP 3,908,862. A composite fluid tank 2 holds a reservoir of composite fluid as, for example, glass fiber filler particles suspended in a liquid monomer such as polyol. The tank 2 has an outlet 4 near its lower extremity where a three-way valve 6 selectively establishes fluid communication between the tank 2 and a conduit 8 leading to a pump 10. The composite fluid tank 2 also has an agitator device 12 which extends into the lower portions of the tank 2 for preventing sedimention of the particulate matter in the fluid.

The valve 6 also selectively establishes fluid communication between the conduit 8 and a monomer flushing tank 14. The flushing tank 14 contains a reservoir of the monomer contained within composite tank 2, absent the suspended glass particulate matter, i.e., the fluid within the flushing tank 14 is a constituent of the composite fluid within the tank 2.

The pump 10 is connected to an outlet conduit 16 which leads to a bypass circuit 18 adjacent a monomer injection cylinder 20. The bypass circuit 18 directs fluid flow through either inlet valve 22 and conduit 24 or bypass valve 26 and conduit 28. The conduit 24 leads to a mixing head (not shown), which mixes the composite fluid from tank 2 during an injection stroke and the mixing head with a second mutually reactive agent from an analogous fluid system mirrored on the opposite side of the mixing head as set forth in the above mentioned patent.

Except for the quantities of fluid that are mixed during injection strokes of the mixing head, the fluid passed through conduit 24 is recirculated to the monomer injection cylinder 20 from a conduit 30 and through a return valve 32 to a heat exchanger 34 by way of a conduit 36. The fluid exits the heat exchanger 34 by way of a conduit 38 where a valve 40 directs the flow to either composite tank 2 or to a flush drum 42. During the injection stroke of the monomer cylinder 20, a displacement rod 44 is axially moved within the monomer cylinder 20 to displace a portion of the fluid contained therein. Immediately prior to or simulataneous with the axial movement of the displacement rod 44, valves 32 and 22 are closed to block conduits 36 and 24 respectively and the valve 26 is opened and the conduit 28. The fluid pressure generated by the displacement rod 44 also opens a check valve 46 and monomer is injected into the mixhead through both conduits 24 and 30.

Prior to system shut-down, a flushing mode is initiated and the three-way valve 6 is activated to discontinue flow from the tank 2 and to connect the flushing tank 14. As mentioned above, the flushing tank 14 contains a constituent of the contents of the composite tank 2, i.e., an unparticulated monomer. A predetermined amount of unparticulated monomer is then withdrawn from the tank 14 by the pump 10 and pumped throughout the system, displacing the particulated monomer. The displacement continues until unparticulated monomer fills the entire system. The displaced monomer is directed to either composite tank 2 or to a separate flush drum 48 according to the dictates of a control valve 40.

The unparticulated monomer remains in the system until system operation is once again commenced. At that time, the valve 6 is moved to block flow from the flush tank 14 and reestablish flow from the composite tank 2. The pump 10 is started and the unparticulated fluid is displaced throughout the system, the displaced unparticulated fluid being collected in either composite tank 2 or the separate flush drum 48. A predetermined compensatory amount of particulate filler, as for example glass filler is then added to the collected unparticulated fluid and the fluid is mixed, then reused in the operative mode of the fluid system.

Although the present invention has been described in conjunction with the preferred embodiment it is to be understood that modifications and variations may be resorted to without departing from the spirit of the invention as those skilled in the art will readily understand. Such modification and variation are considered to be within the view and scope of the present invention as defined by the appended claims.

What is claimed is:

1. A method of flushing a portion of a liquid reaction molding system containing a process liquid with particulate suspensions, which comprises:

(a) discontinuing flow of a particulate suspension liquid into a portion of the liquid reaction molding system from a particulate fluid source;

(b) flushing the particulate suspension liquid with a similar unparticulated liquid prior to system shutdown;

(c) reconvening the flow of particulate suspension liquid and flushing the similar unparticulated liquid with particulate suspension liquid prior to system start-up;

(d) mixing the flushed unparticulated fluid with process fluid from the particulate fluid source; and (e) adjusting the particulate content of the fluid source.

2. A method of purging a particulated liquid process reagent from a predetermined portion of a liquid reaction molding system for shut-down and start-up, comprising the steps of:

(a) flushing the liquid particulated process reagent from the predetermined portion of the system with a similar unparticulated reagent prior to system shutdown;

(b) storing the unparticulated reagent in the predetermined portion of the system during system shutdown;

(c) subsequently flushing the unparticulated reagent from the predetermined portion of system prior to system startup;

(d) collecting the flushed reagent from step (c);

(e) adding compensatory amounts of particulate matter to the collected reagent; and (d) jointly utilizing the compensated reagent with the process reagent in the liquid reaction molding system.

* * * * *